(12) United States Patent
Jonnala (10) Patent No.: US 8,675,498 B2
(45) Date of Patent: *Mar. 18, 2014

(54) SYSTEM AND METHOD TO PROVIDE AGGREGATED ALARM INDICATION SIGNALS

(75) Inventor: Nagi Reddy Jonnala, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 663 days.

This patent is subject to a terminal disclaimer.

(21) Appl. No.: 12/703,466

(22) Filed: Feb. 10, 2010

(65) Prior Publication Data

US 2011/0194417 A1      Aug. 11, 2011

(51) Int. Cl.
    *H04J 1/16*           (2006.01)
(52) U.S. Cl.
    USPC .................................. 370/242; 370/213
(58) Field of Classification Search
    USPC ......... 370/242, 276, 216, 217, 221, 250, 218, 370/389, 241, 243, 245, 390, 466, 467
    See application file for complete search history.

(56) References Cited

U.S. PATENT DOCUMENTS

| | | | |
|---|---|---|---|
| 2003/0185223 A1 | 10/2003 | Tate et al. | |
| 2004/0160895 A1* | 8/2004 | Holmgren et al. | 370/223 |
| 2006/0031482 A1 | 2/2006 | Mohan et al. | |
| 2008/0172497 A1* | 7/2008 | Mohan et al. | 709/249 |
| 2009/0059799 A1* | 3/2009 | Friskney et al. | 370/241.1 |

FOREIGN PATENT DOCUMENTS

| | | |
|---|---|---|
| CN | 1633082 A | 6/2005 |
| CN | 101015157 A | 8/2007 |

OTHER PUBLICATIONS

"European Patent Application No. 111675443—Extended EP Search Report mailed Aug. 11, 2011", 7 pgs.
"European Patent Application No. 11167544.3—Extended EP Search Report Response Filed Oct. 13, 2011", 4 pgs.
"OAM functions and mechanisms for Ethernet based networks Y.1731", ITU-T Drafts; Study period 2009-2012, International Telecommunication Union, Geneca; CH. vol. Study Group 15, (Sep. 21, 2010), 82 pgs.
"Chinese Application Serial No. 201010622667.7, Office Action mailed Mar. 11, 2013", w/English translation, 21 pgs.
"Chinese Application U.S. Serial No. 201010622667.7, Response filed Jul. 23, 2013 to Office Action mailed Mar. 11, 2013", Chinese only, 8 pgs.
"European Application Serial No. 11167544.3, Office Action mailed Apr. 19, 2013", 4 pgs.
"European Application Serial No. 11167544.3, Response filed Mar. 14, 2013 to Extended European Search Report mailed Aug. 11, 2011", 6 pgs.
"OAM functions and mechanisms for Ethernet based networks Y.1731", Telecommunication Standardization Sector of ITU, 200802, Sections 4, 6, 7 and 9, Feb. 2008.

* cited by examiner

*Primary Examiner* — Huy D. Vu
*Assistant Examiner* — Dady Chery
(74) *Attorney, Agent, or Firm* — Schwegman Lundberg & Woessner, P.A.

(57) ABSTRACT

In an example embodiment, a method and system to provide aggregated alarm indication signals is provided. In example embodiments, an affected intermediate node detects a signal failure. A list of affected networks is determined, and a single aggregated alarm indication signal (AIS) message is generated per MEG level. The aggregated AIS message is then multicast to affected nodes. Instead of sending one AIS message per affected network, a single aggregated AIS message from the affected intermediate node may be generated and sent regardless of the number of affected networks.

20 Claims, 7 Drawing Sheets

SYSTEM AND METHOD TO PROVIDE AGGREGATED ALARM INDICATION SIGNALS

FIELD

The present disclosure relates generally to computer networks. In an example embodiment, the disclosure relates to providing aggregated alarm indication signals.

BACKGROUND

An alarm indication signal (AIS) is typically used to indicate a signal failure. The use of the AIS is widely popular and used in many transport platforms and standards, and also used in various applications. For example, the AIS may suppress alarms that are on nodes that are not the root cause of a failure. Further, the AIS may trigger protection switching, for instance, by switching a node to a protected service virtual local area network (SVLAN). In another example, the AIS may raise a non-critical and non-reportable alarm (e.g., not reported to a user autonomously) to a network management system.

BRIEF DESCRIPTION OF DRAWINGS

The present disclosure is illustrated by way of example and not limitation in the figures of the accompanying drawings, in which like references indicate similar elements.

DETAILED DESCRIPTION

The following detailed description includes references to the accompanying drawings, which form a part of the detailed description. The drawings show, by way of illustration, example embodiments in which the claimed subject matter may be practiced. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail. As used herein, the term "or" may be construed in either an inclusive or exclusive sense.

Overview

Embodiments provide systems and methods to provide an aggregated alarm indication signal. In example embodiments, an intermediate node detects a signal failure. A list of affected nodes is determined, and an aggregated alarm indication signal (AIS) message is generated. The aggregated AIS message is then multicast to the affected nodes. Instead of sending one AIS message per network, a single aggregated AIS message from the affected intermediate node may be generated and sent regardless of the number of affected networks. For simplicity of discussion, references to a node and a switch are used interchangeably below.

Example Embodiments

Figure 1:
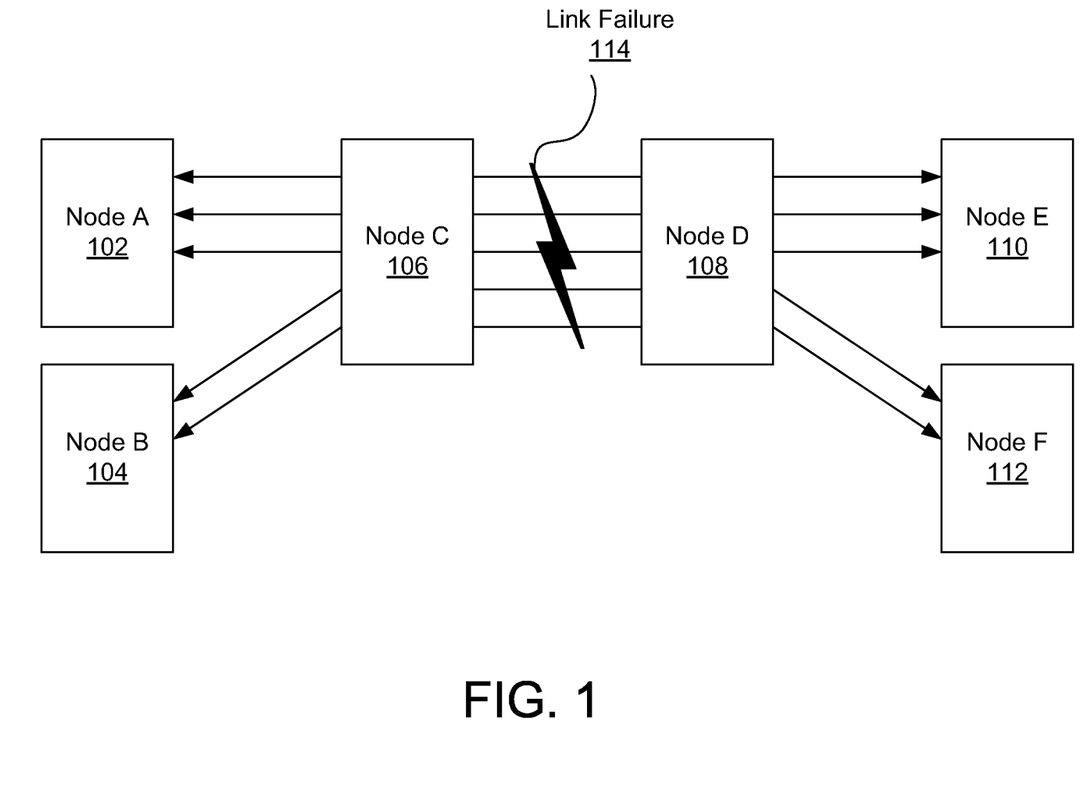
FIG. 1 depicts a conventional alarm indication signal (AIS) example environment.

FIG. 1 depicts a diagram of an example conventional alarm indication signal (AIS) example environment. In this example environment, a plurality of nodes (e.g., node A 102, node B 104, node C 106, node D 108, node E 110, and node F 112) are coupled in communication via a plurality of local area networks (e.g., depicted with lines in FIG. 1). The local area networks (LANs) comprise virtual LANs, and more particularly, service virtual LANs (SVLANs).

If a link failure 114 occurs between nodes, such as intermediate node C 106 and intermediate node D 108, a plurality of AIS messages are typically generated. Specifically, the affected node C 106 generates five AIS messages, one message for each SVLAN associated with node C 106 (e.g., three AIS messages to node A 102 and two AIS messages to node B 104). Similarly, node D 108 also generates five AIS messages, one message for each SVLAN associated with node D 108 (e.g., three AIS messages to node E 110 and two AIS messages to node F 112). Because, for example, the ITU-T Y.1731 standard defines that one AIS message is sent per SVLAN, the example environment of FIG. 1 will result in ten AIS messages being sent (assuming a single maintenance entity group level).

FIG. 1 illustrates a simplified example of the conventional AIS environment. Hundreds of SVLANs may be initiated by an edge node or switch (e.g., node A 102, node B 104, node E 110, and node F 112). As a result, the affected intermediate node (e.g., node C 106 or node D 108) may create a storm of AIS messages to these edge nodes, especially if the affected intermediate node is close to either a source or destination. In embodiments having large gigabyte interfaces (e.g., 40 gigabit or 100 gigabit interfaces) that carry thousands of services, a single failure in a link may trigger hundreds or thousands of alarms and AIS messages.

Attempts have been made to mitigate this problem. For example, after generating the first few AIS messages on a SVLAN, AIS message generation may be cooled off. That is, instead of generating a message every second, for example, a message may be generated every minute. However, all the messages still need to be generated. Thus, there is no reduction in the number of AIS messages generated by the affected intermediate node. In fact, the cooling off process may cause inefficient protection switching when AIS messaging is used as a trigger. Furthermore, the edge node still needs to process many AIS messages if the edge node has sourced any SVLANs that go through a link subject to the failure.

Figure 2:
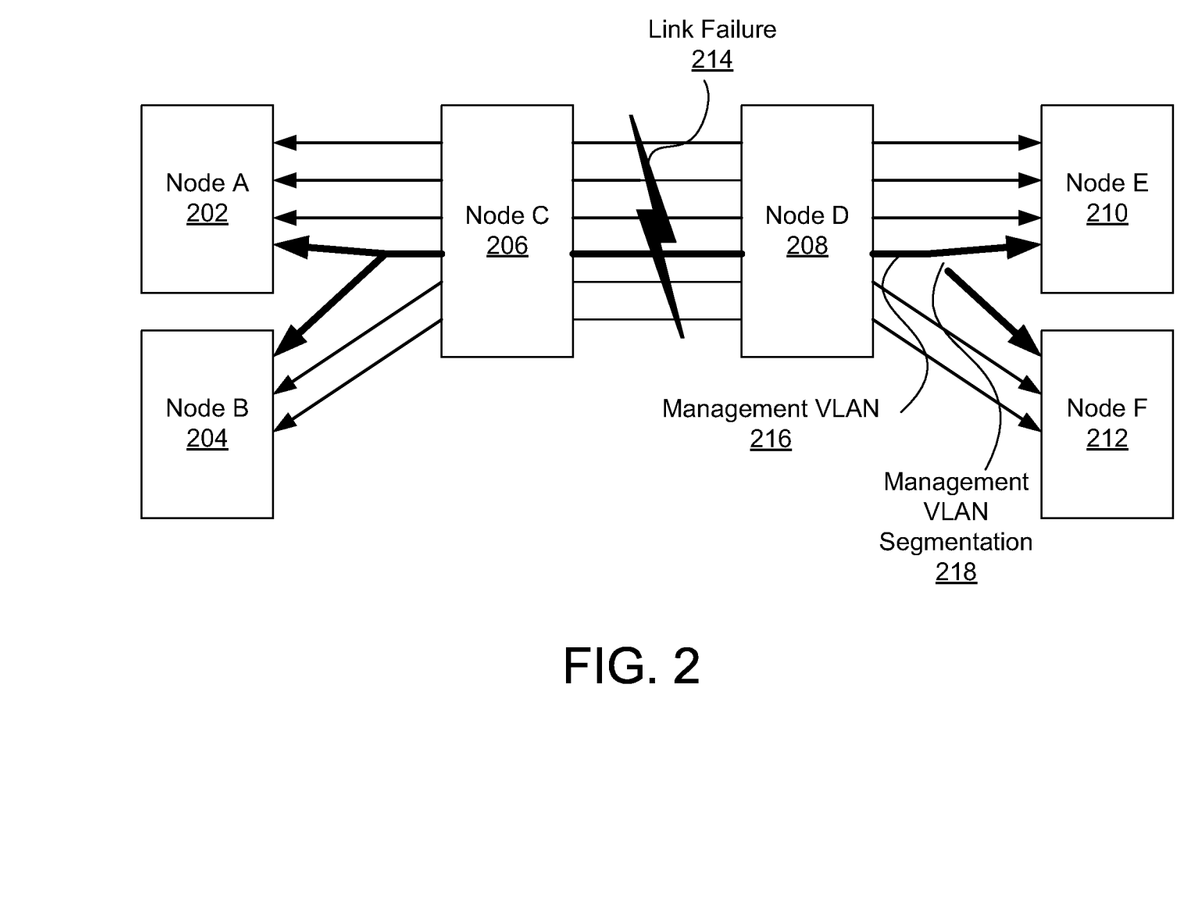
FIG. 2 depicts an aggregated AIS environment according to an example embodiment.

An aggregated AIS environment of FIG. 2 allows an aggregated AIS message to be generated instead of individual AIS messages for each SVLAN and each node. In this example environment, a plurality of nodes (e.g., node A 202, node B 204, node C 206, node D 208, node E 210, and node F 212) are coupled in communication via a plurality of virtual local area networks (e.g., depicted with lines in FIG. 2). A management service virtual LAN (SVLAN) 216 also communicatively couples the various nodes of FIG. 2.

In this embodiment, when a link failure 214 between nodes, such as intermediate node C 206 and intermediate node D 208, occurs, a single aggregated AIS message is generated by the affected intermediate node where the signal failure occurs (e.g., node C 206) for each maintenance entity group (MEG) level. The aggregated AIS message is then multicast towards edge node A 202 and node B 204. In one embodiment, up to eight MEG levels may be present, thus resulting in eight aggregated AIS messages. In example embodiments, the aggregated AIS message is sent via the management VLAN 216.

Additionally, if the management VLAN 216 is broken or experiences a management VLAN segmentation 218, then node D 208 may also generate an aggregated AIS message for each MEG level. The aggregated AIS message from node D 208 is then multicast towards edge node E 210 and edge node F 212. In this example assuming eight MEG levels, at most, sixteen aggregated AIS messages may be sent from the node experiencing the signal failure (e.g., node C 206) and the node associated with the management VLAN failure (e.g., node D 208), as opposed to a convention system, which may send eighty regular AIS messages (e.g., one AIS message per SVLAN from node C and node D for each of eight MEG levels=10×8=80).

Because of the drastic reduction in AIS messages that need to be generated and transmitted, processing, as an example, may be reduced and bandwidth available for use on the system may be increased. For example, the edge nodes will process fewer AIS messages from the same affected intermediate node. This may result in a quicker response time for the edge node to handle the signal failure.

It should be noted that in the embodiments of FIG. 1 and FIG. 2, any number of other intermediate nodes may be positioned between the depicted intermediate nodes (e.g., node C and node D) and the edge nodes (e.g., node A, node B, node E, and node F). These downstream intermediate nodes of the transport circuit or environment propagate the AIS message onward to the destination or edge node.

Figure 3:
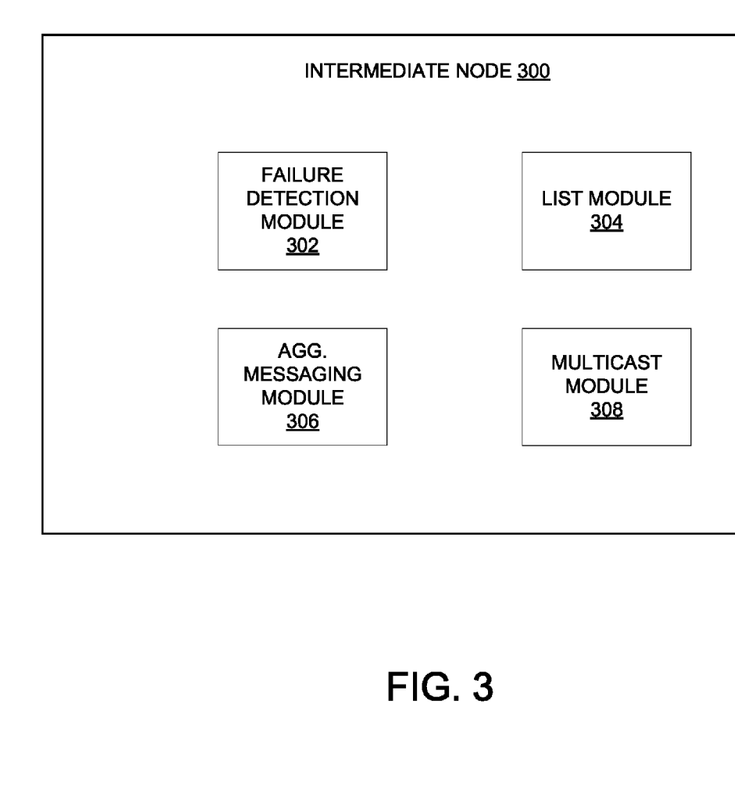
FIG. 3 depicts an affected intermediate node of the aggregated AIS environment.

FIG. 3 depicts an affected intermediate node 300 of the aggregated AIS environment, according to an example embodiment. The affected intermediate node 300 detects a signal failure and generates AIS messages accordingly. The affected intermediate node 300 may be, for example, node C 206 or node D 208 of FIG. 2. The affected intermediate node 300 comprises a failure detection module 302, a list module 304, an aggregated messaging module 306, and a multicast module 308. The affected intermediate node 300 may comprise other modules or components not directly related to AIS message generation, which are not shown or described.

The failure detection module 302 detects a signal failure or any other event that can trigger an AIS message that occurs on the affected intermediate node 300. In example embodiments, the affected intermediate node 300 is the node where the signal failure occurs (or is the closest node to the signal failure). Alternatively, the affected intermediate node 300 may be the closest node to a segment break in the management VLAN.

The list module 304 compiles a list that is used by the affected intermediate node 300 to generate the aggregated AIS message. The list may, in one embodiment, comprise all SVLANs that are affected by the signal failure on a link. The list may also include all link failures and hence all SVLANs information on these links on a given port. The list may be based on a configured MEG level.

In example embodiments, the aggregated messaging module 306 generates a single aggregated AIS message per MEG level. The aggregated AIS message may indicate all ports and all SVLAN information of the affected ports.

The multicast module 308 multicasts the aggregated AIS message. The aggregated AIS message essentially takes the place of the failed data. In example embodiments, the aggregated message is multicast via the management VLAN. The multicast may be performed using, for example, a multicast address of DA 01-80-C2-00-00-3y, where y represents a MEG level, using an ITU-T Y.1731 standard. However, any standard or multicast address may be utilized in alternative embodiments.

Figure 4:
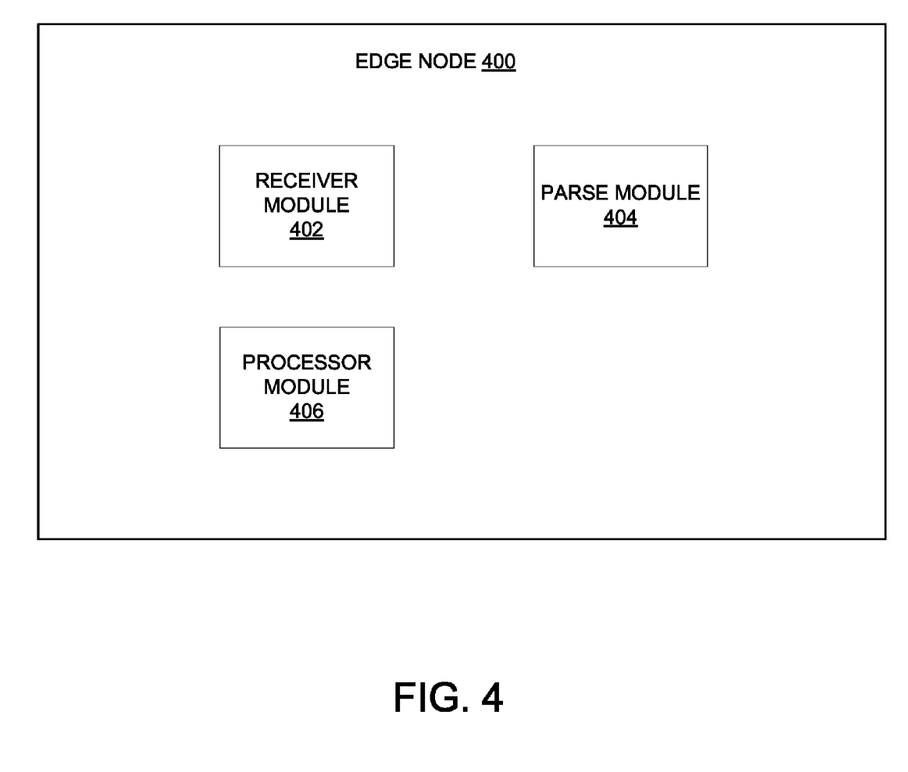
FIG. 4 depicts an edge node of the aggregated AIS environment.

FIG. 4 depicts an edge node 400 of the aggregated AIS environment, according to an example embodiment. The edge node 400 receives and processes the aggregated AIS message. The edge node 400 may, for example, be node A 202, node B 204, node E 210, or node F 212 of FIG. 2. In example embodiments, the edge node 400 may comprise a receiver module 402, a parse module 404, and a processor module 406. The edge node 400 may also comprise other modules or components not directly related to AIS message processing, which are not shown or described herein.

The receiver module 402 receives the aggregated AIS message sent from the affected intermediate node. Because each MEG level may have a separate aggregated AIS message, the edge node 400 may receive more than one aggregated AIS message from the affected intermediate node. However, the number of aggregated AIS messages is limited to the maximum number of MEG levels available (e.g., eight).

The parse module 404 parses the received aggregated AIS message. The parsed AIS message may provide information such as the list of affected SVLANs or any other information related to AIS.

In example embodiments, the processor module 406 processes the information obtained from parsing the AIS message. Specifically, the processor module 406 processes an AIS failure against all the SVLANs reported in the aggregated AIS message. This processing of the AIS failure may be similar to conventional processing of an AIS failure (e.g., as if the AIS failure is reported against each SVLAN as conventionally performed).

If the edge node 400 is serving as both a MEG end point (MEP) and a MEG intermediate point (MIP), then the processor module 406 may aggregate alarm indication signals. That is, the processor module 406 will process the edge node's own link faults and aggregate network level alarm indication signals that the edge node 400 received internally from a domain at the MEP's management level. In some embodiments, the edge node 400 may include some of the modules for the intermediate node 300 of FIG. 3. The aggregated network level alarm indication signals may be forwarded on towards a further edge node for which the edge node 400 is acting as a MIP.

Figure 5:
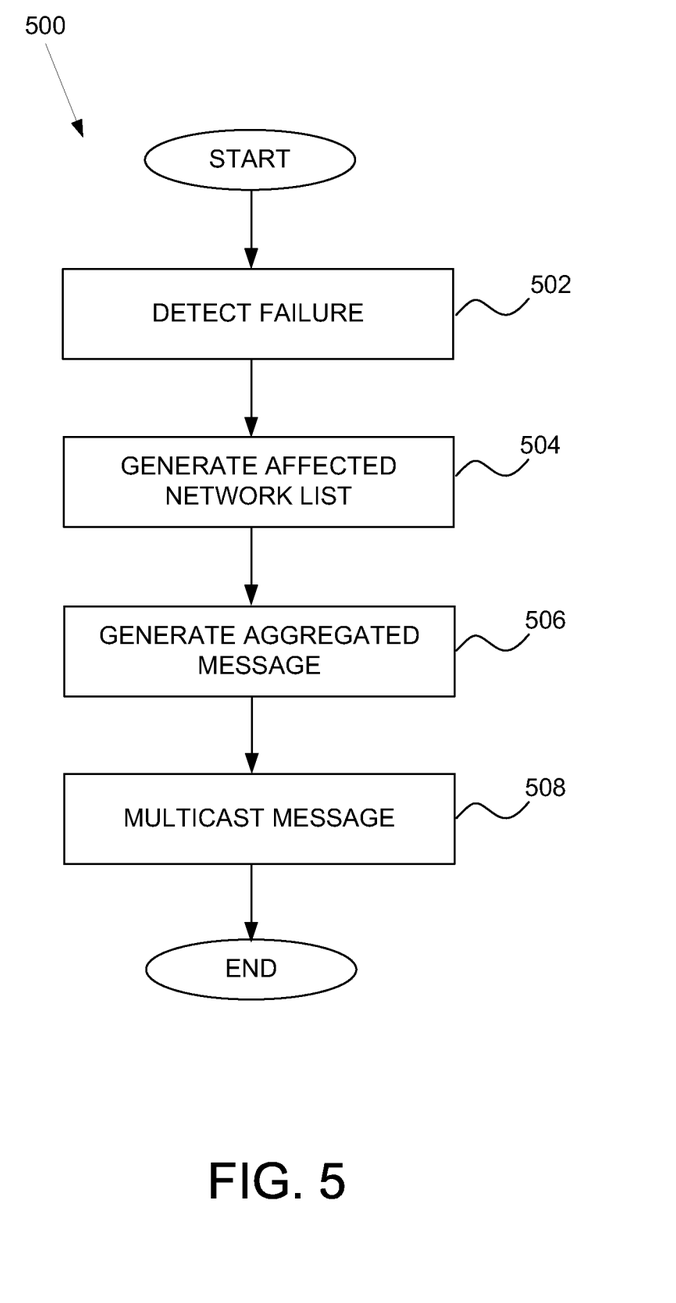
FIG. 5 depicts a flow diagram of a method to provide aggregated AIS messaging, in accordance with an example embodiment.

FIG. 5 depicts a flow diagram of a method 500 to provide aggregated AIS messaging, in accordance with an example embodiment. In operation 502, a signal failure is detected. In example embodiments, the failure detection module 302 (as shown in FIG. 3) of the affected intermediate node where the signal failure occurs detects the failure. For example and referring to FIG. 2, a signal failure may occur at or near intermediate node C 206.

A list of affected networks is generated in operation 504. The list may comprise virtual local area networks and more particularly, service virtual local area networks (SVLANs) that are affected by the signal failure with a configured MEG level. The list may also include all link failures and hence all SVLANs information on these links on a given port. Continuing with the example environment of FIG. 2, the list of SVLANs affected by the signal failure at node C 206 includes SVLANs communicatively coupling node C 206 with node A 202 and node B 208.

At operation 506, an aggregated AIS message is generated for each MEG level. The aggregated AIS message may cover all port and SVLAN information of the affected ports.

The aggregated AIS message is multicast in operation 508. In example embodiments, the multicast module 308 multicasts the aggregated AIS message towards affected edge nodes via a management VLAN. In the example of FIG. 2, the aggregated AIS message is sent from node C 206 to node A 202 and node B 204 using the management VLAN 216.

Figure 6:
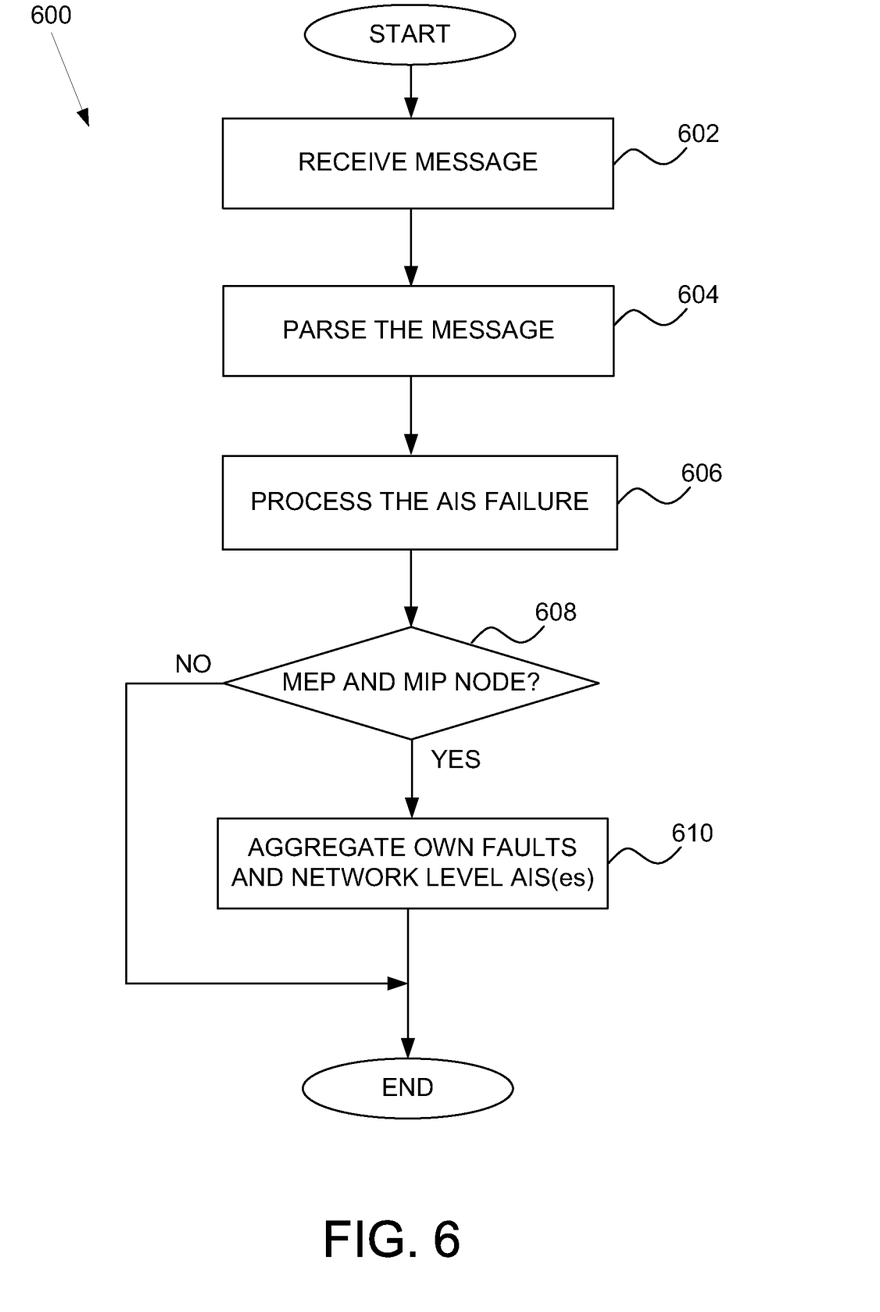
FIG. 6 depicts a flow diagram of a method to process a received aggregated AIS message, in accordance with an example embodiment.

FIG. 6 depicts a flow diagram of a method 600 to process a received aggregated AIS message, in accordance with an example embodiment. At operation 602, the aggregated AIS message is received by a receiver module 402 (as shown in FIG. 4) of an edge node (e.g., node A 202). The aggregated AIS message may, in some embodiments, be forwarded through one or more intermediate nodes before reaching the edge node.

Once received, the aggregated AIS message is parsed in operation 604. In example embodiments, the parse module 404 of the edge node 400 parses the aggregated AIS message to determine the list of affected SVLANs. Other information associated with the signal failure may also be extracted from the aggregated AIS message.

At operation 606, the AIS failure is processed. In one embodiment, the processor module 406 of the edge node 400 processes the AIS failure against all the SVLANs reported in the aggregated AIS message. This processing of the AIS failure occurs in a similar manner to conventional processing of an AIS failure.

At operation 608, a determination is made as to whether the edge node 400 is serving as both a MEG end point (MEP) and a MEG intermediate point (MIP). If the edge node 400 is serving as both a MEP and a MIP, then at operation 610, the edge node 400 processes its own faults and aggregates any network level alarm indication signals.

It should be noted that on an edge switch where MEPs are created, edge switch hardware (e.g., receiver module 402) may be programmed such that aggregated AIS messages destined to a management VLAN for a given MEG level may be punted to a control plane (e.g., processor module 406).

As such, a signal failure will generally trigger generation of a single aggregated AIS message, per MEG level, by the affected intermediate node, which is experiencing the signal failure. This results in a reduction from the many messages (as many as there are SVLANs passing through a link of the affected intermediate node) that are required by conventional systems. Consequentially, in one embodiment, a single aggregated AIS message, per MEG level, needs to be processed by the edge node (as opposed to as many messages as there are SVLANs sources/destined on the edge node). Thus, if there is only one domain and no segmentation in the management VLAN, then one aggregated AIS message is generated.

Furthermore, because the aggregated AIS message is multicast in the management VLAN, one aggregated message per node or switch, per MEG level, is good for the entire network. Thus, only one aggregated message per node or switch may need to be processed, per MEG level. If there is a segmentation in the management VLAN, then one AIS message is generated for each MEG level on either side of the segment caused by the signal failure. Therefore, in a single domain embodiment, as few as two aggregated AIS messages are generated.

The generation and processing times can be dramatically reduced over conventional systems. For example, the AIS message can be generated in a millisecond order resulting in processing of the AIS message in an order of milliseconds. This may result in faster protection switch overs (e.g., in terms of sub-50 millisecond path protection switch over using a G.8031 APS mechanism). Additionally, up-to-date (e.g., quicker) error reporting to the network management system may occur since there is no cool off after the first AIS message generation.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 7:
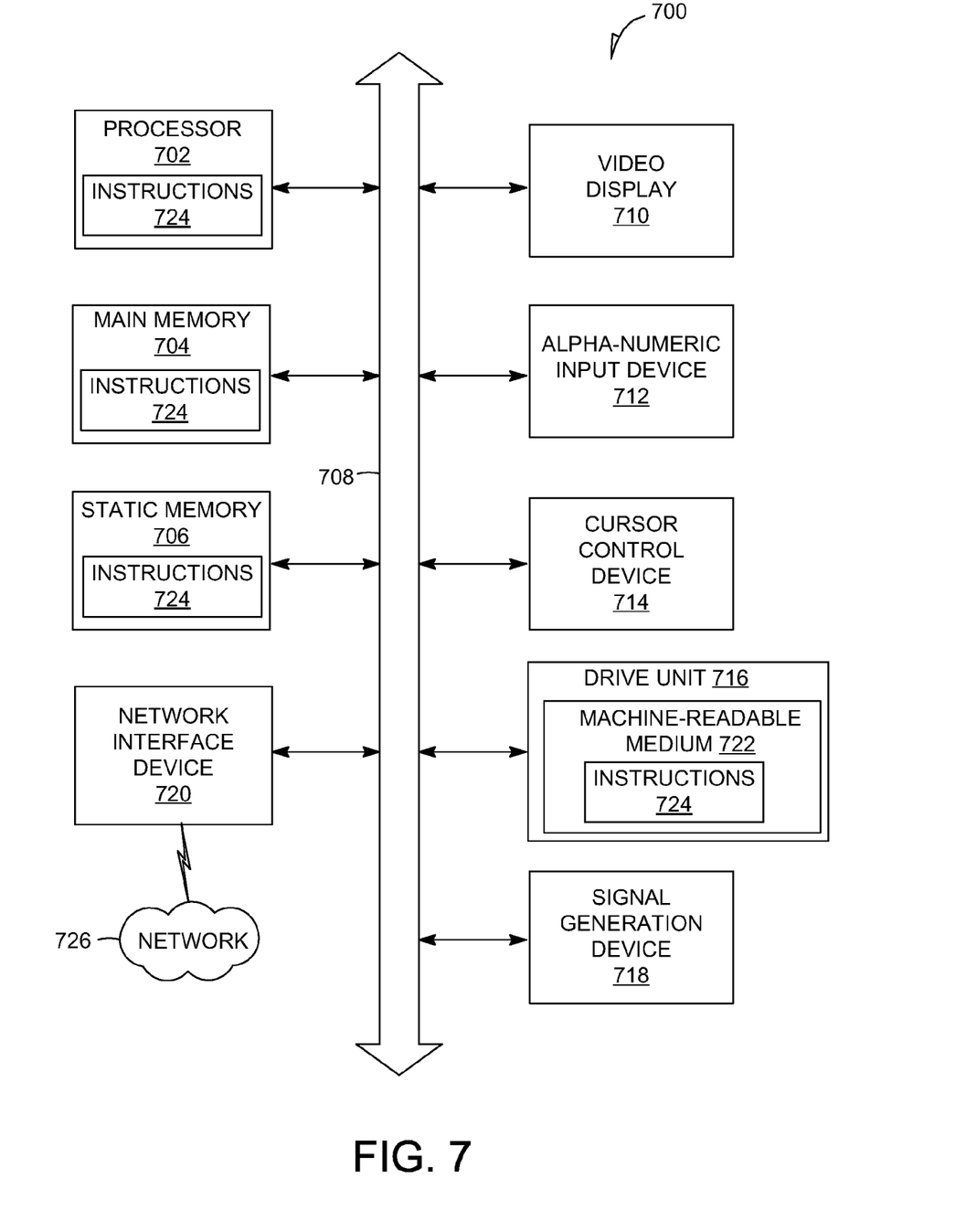
FIG. 7 is a simplified block diagram of a machine in the example form of an apparatus within which a set of instructions, for causing the machine to perform any one or more of the methodologies discussed herein, may be executed.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alphanumeric input device 712 (e.g., a keyboard), a user interface (UI) navigation device or cursor control device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   detecting a signal failure at an affected intermediate node;
   determining a list of networks affected by the signal failure and a corresponding maintenance entity group (MEG) level for each network in the list of networks affected by the signal failure;

generating, using one or more processors, a single aggregated alarm indication signal (AIS) message for each MEG level in the list resulting in a reduction from an AIS message sent per network to the single aggregated message sent per MEG level, each MEG level comprising a plurality of networks; and multicasting the single aggregated AIS message generated for each MEG level.

2. The method of claim 1, wherein each MEG level comprises a plurality of virtual local area networks (VLANs).

3. The method of claim 1, wherein the networks are service virtual local area networks (SVLANs).

4. The method of claim 1, wherein the determining of the networks affected by the signal failure comprises determining networks that are affected on a given port.

5. The method of claim 1, wherein the multicasting of the single aggregated AIS message comprises multicasting the single AIS message using a management virtual local area network (VLAN) that is distinct from a service virtual local area network (SVLAN).

6. The method of claim 1, wherein the detecting of the signal failure comprises detecting a segment break of a management virtual local area network (VLAN) that is distinct from a service virtual local area network (SVLAN).

7. The method of claim 6, further comprising generating a second single aggregated AIS message from a second affected intermediate node for each MEG level, the second affected intermediate node being located on a side of the segment break different from a side on which the affected intermediate node is located.

8. The method of claim 1, further comprising parsing the aggregated AIS message at an affected node receiving the aggregated AIS message to obtain information regarding the affected networks.

9. The method of claim 8, further comprising processing the signal failure against all the affected networks reported in the aggregated AIS message.

10. An apparatus comprising:
one or more processors of a machine;
a failure detection module to detect a signal failure at an affected intermediate node;
a list module to determine a list of networks affected by the signal failure and a corresponding maintenance entity group (MEG) level for each network in the list of networks affected by the signal failure;
an aggregated messaging module to generate, using the one or more processors, a single aggregated alarm indication signal (AIS) message for each MEG level in the list resulting in a reduction from an AIS message sent per network to the single aggregated message sent per MEG level, each MEG level comprising a plurality of networks; and
a multicast module to multicast the single aggregated AIS message generated for each MEG level.

11. The apparatus of claim 10, wherein each MEG level comprises a plurality of virtual local area networks (VLANs).

12. The apparatus of claim 10, wherein the networks are service virtual local area networks (SVLANs).

13. The apparatus of claim 10, wherein the multicast module multicasts the single aggregated AIS message using a management virtual local area network (VLAN) that is distinct from a service virtual local area network (SVLAN).

14. The apparatus of claim 10, wherein the failure detection module is further configured to detect a segment break of a management virtual local area network (VLAN) that is distinct from a service virtual local area network (SVLAN).

15. The apparatus of claim 10, further comprising a parse module to parse the aggregated AIS message at an affected node receiving the aggregated AIS message to obtain information regarding the affected networks.

16. The apparatus of claim 15, further comprising a processor module to process, at the affected node, the signal failure against all the affected networks reported in the aggregated AIS message.

17. A tangible machine-readable storage device in communication with the at least one processor, the machine-readable storage device storing instructions which when executed by the at least one processor causes operations to be performed, the operations comprising:
detecting a signal failure at an affected intermediate node;
determining a list of networks affected by the signal failure and a corresponding maintenance entity group (MEG) level for each network in the list of networks affected by the signal failure;
generating, using one or more processors, a single aggregated alarm indication signal (AIS) message for each MEG level in the list resulting in a reduction from an AIS message sent per network to the single aggregated message sent per MEG level, each MEG level comprising a plurality of networks; and
multicasting the single aggregated AIS message generated for each MEG level.

18. The tangible machine-readable storage device of claim 17, wherein each MEG level comprises a plurality of virtual local area networks (VLANs).

19. The tangible machine-readable storage device of claim 17, wherein the multicasting of the single aggregated AIS message comprises multicasting the single AIS message using a management virtual local area network (VLAN) that is distinct from a service virtual local area network (SVLAN).

20. The tangible machine-readable storage device of claim 17, wherein the detecting the signal failure comprises detecting a segment break of a management virtual local area network (VLAN) that is distinct from a service virtual local area network (SVLAN).

* * * * *